UNITED STATES PATENT OFFICE.

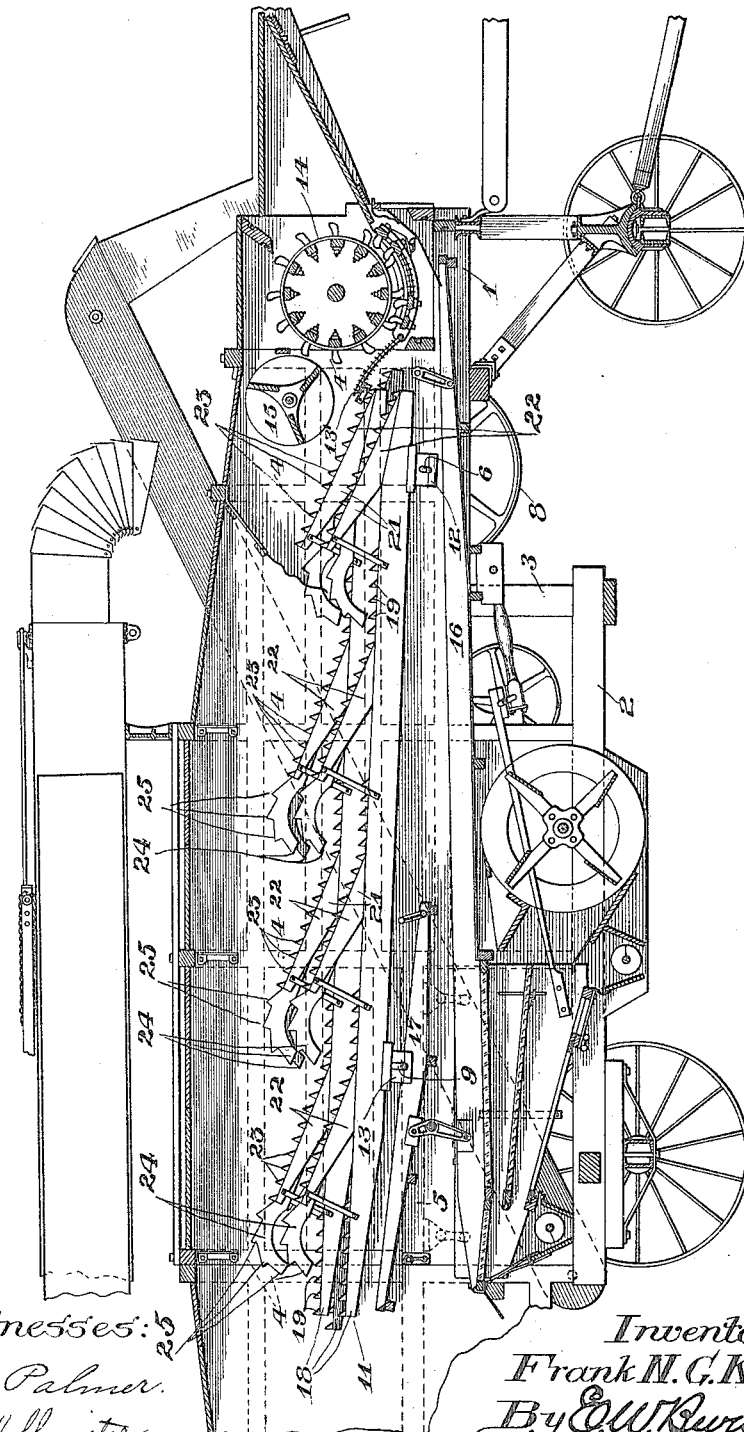

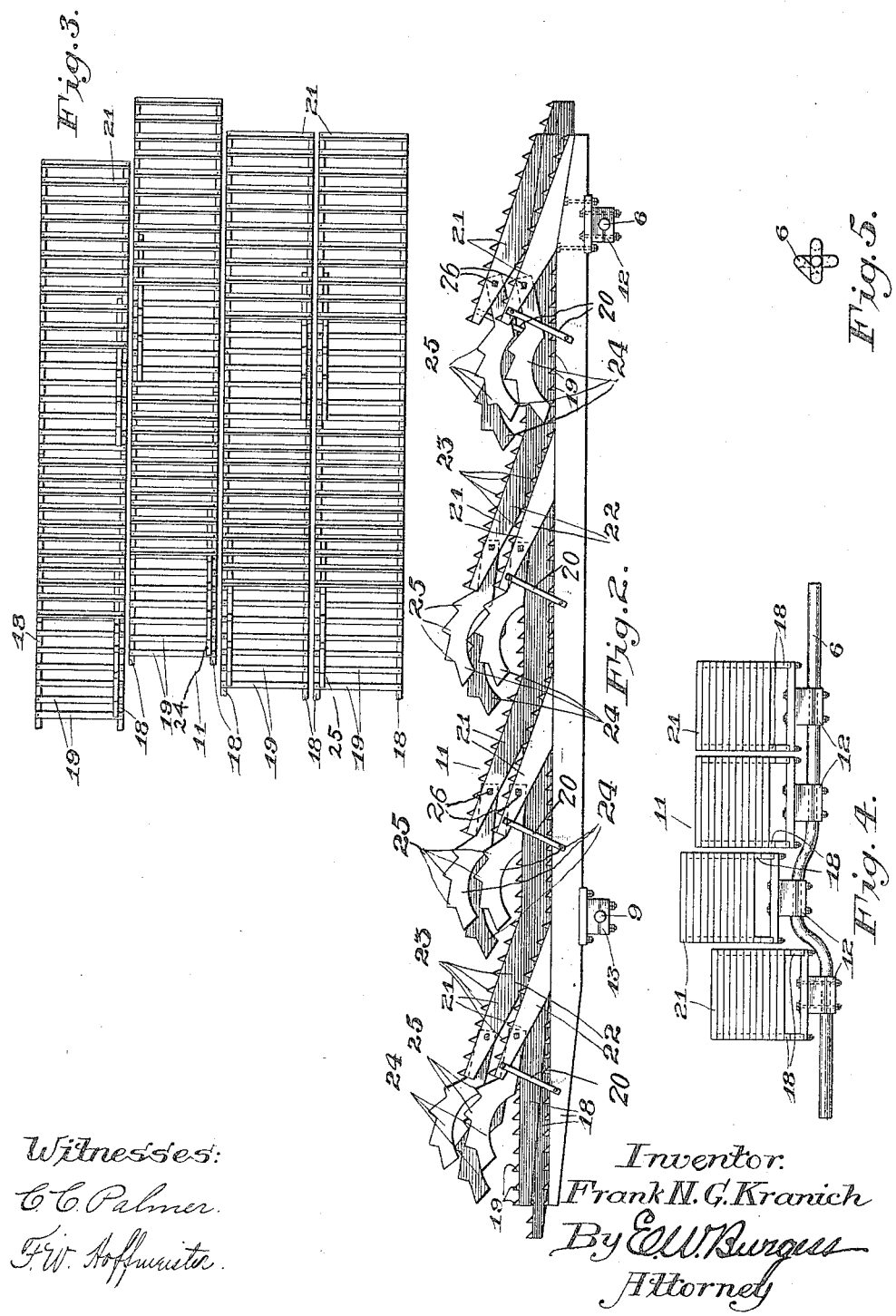

FRANK N. G. KRANICH, OF RACINE, WISCONSIN, ASSIGNOR TO BELLE CITY MANUFACTURING COMPANY, A CORPORATION OF WISCONSIN.

THRESHING-MACHINE.

1,202,762.  Specification of Letters Patent.  Patented Oct. 24, 1916.

Application filed November 29, 1911. Serial No. 662,960.

*To all whom it may concern:*

Be it known that I, FRANK N. G. KRANICH, a citizen of the United States, residing at Racine, in the county of Racine and State of Wisconsin, have invented certain new and useful Improvements in Threshing-Machines, of which the following is a specification.

My invention relates to threshing machines, and in particular to the construction and manner of operating the reciprocating straw carriers therefor, commonly termed straw racks.

It has among its objects to provide an improved straw carrying mechanism which will thoroughly and quickly separate the grain from the straw, thereby eliminating the loss of grain over the delivery end of the carrier.

A further object of my invention is to provide a straw carrier mechanism of light and efficient construction operable with a small amount of power and balanced in such a manner that it will reduce the vibration and the end shake of the machine.

These and other objects and advantages of my invention will hereinafter more fully appear.

I attain these objects by means of a series of improved straw racks, each including horizontal and inclined portions of improved construction and improved agitators carried on said inclined portions, these straw racks being operatively connected to and driven by improved operating mechanism including an improved multiple throw drive, all as hereinafter more fully described.

In order that my invention may be disclosed as required by the statutes, I have shown herein one embodiment which the same may assume in practice and will herein specifically describe that embodiment as illustrative of one of the forms which the invention may assume.

In these drawings: Figure 1 is a sectional side elevation of a threshing machine having my improved straw carrier mechanism thereon. Fig. 2 is a side elevation of the straw carrying mechanism removed from the machine. Fig. 3 is a top plan view of a portion of the straw racks. Fig. 4 is an end elevation of the right hand end of Fig. 2 showing one of the cranks connected to the straw racks. Fig. 5 is an end elevation of one of the multiple crank shafts.

In this construction the machine frame is provided with base sill members 1 and 2 and with short vertical frame members 3 at opposite sides thereof connecting the front ends of the members 2 with the front ends of the members 1. Other vertically arranged spaced frame members 4 are also provided, to which the side walls of the machine are secured, while upper frame members 5 are arranged parallel with the base sills at the rear of the machine and upon opposite sides thereof, which have their opposite ends secured to the vertical members 4 at points intermediate the ends of the latter.

Carried above the front end of the sill members 1 is a transversely arranged multiple throw crank shaft 6 journaled in suitable bearing blocks secured to the base sill members 1 intermediate the ends of the latter. This crank 6 has a driving pulley 8 secured at one end thereof. Toward the rear end of the sill member 1 is a second transversely arranged multiple throw crank shaft 9 journaled in similar bearing blocks supported on the members 5. As shown in Figs. 4 and 5, the cranks upon each of these shafts 6 and 9 are of relatively short throw and arranged at an angle of 90° relative to each other, four of the same being provided. Coöperating with these cranks and driven thereby is a series of straw racks 11 arranged in parallel relation and having bearing blocks 12 and 13 secured to their front and rear ends respectively. In these bearing blocks are journaled complemental cranks on each crank shaft, the racks thus acting as pitmen between these cranks. As shown, four of these straw racks are used and the same are arranged in the machine in rear of the grate 13', cylinder 14 and beater 15 and above the grain conveyer 16 and grain return pan 17, the construction being such that as the straw is threshed by the cylinder 14, it is delivered rearward upon these racks and any threshed grain remaining therein is separated therefrom by the racks, falling down through them to the grain handling mechanism 16, 17, while the straw itself is ejected through the open end of the machine onto the straw pile. Each of these straw racks is shown to include longitudinally extending side rails 18 disposed in parallel relation and bridged at intervals by sections of horizontally disposed transversely arranged, parallel slats 19 having peaked upwardly extending straw engaging edges. Braced on these side rails 18 by braces 20 and disposed between the horizontal sections thereof are inclined members or risers 21 having their lower ends attached to the side rails 18 at 22 and provided on their inclined portions with transversely arranged slats 23 spaced apart in the same manner as the slats 19 upon the horizontal sections and of a similar construction to those slats. Carried upon the upper and rearward ends of these inclined members or risers 21 are upwardly and rearwardly curved arcuate agitators or agitator bars 24 having straw engaging teeth 25 upon the upper edges of the same. As shown, these agitators 24 are attached to the inclined members 21 by a suitable nut and bolt connection 26 and project rearwardly therefrom in planes disposed substantially at right angles to the planes of the inclined sections formed by the transverse slats 23.

In the operation of the device, motion is transmitted to the front crank shaft 6 by means of the pulley 8, and this crank shaft operating through its rack members as pitmen transmits its motion to the rear crank shaft 9. Obviously, therefore, as the pulley 8 is rotated an orbital movement will be transmitted to the straw racks, and since the latter are connected at their opposite ends to corresponding cranks on the four-throw shafts 6 and 9, one of the same will be moved upward bodily as its fellow is moved downward, and another will be projected bodily longitudinally in one direction as its fellow is so projected in an opposite direction. It is thus seen that the straw delivered by the cylinder 14 to the racks will be acted upon with a constant agitating action as soon as it falls thereon, this agitating action at the same time impelling the straw rearward with a series of short intermittent motions at different points along its length and its width in such a manner as to eject it in a continuous stream without any appreciable inactive moments. During this movement of the racks it is also to be noted that the agitators 24 rise and fall beneath the straw, tending to lift the same and fluff it out, and that the peaked edges of the slats on both the horizontal and inclined portions of the racks also assist in producing a good straw gripping and forwarding action.

In practice it has been demonstrated that this construction is exceedingly efficient, little or no grain being ejected over the end of the carrier with the straw. Further, due to the improved operating mechanism for the racks, it has been found to be a distinct improvement over those constructions wherein a double-throw crank is used, the end shake or longitudinal reciprocation of the entire thresher, so generally found in the double-crank constructions mentioned, being entirely eliminated. This naturally has resulted in increase in life of the entire machine, at the same time that it has reduced the noise of operation and rendered it easier to find locations for the machine. Due to this same construction, wherein a practically constant rotating motion is transmitted to the racks, it has also been demonstrated that a very appreciably smaller amount of power is required, as the longer power consuming thrusts of the double-throw type of rack are entirely eliminated. It is further to be noted that under certain operating conditions where it is desirable to vary the lifting effect of the agitators 24, this can be readily accomplished by releasing the bolt 26 therefor and adjusting the agitators to the desired angle, the same being rigidly attachable to the inclined members by these bolts in each of their positions of adjustment. Attention is here also directed to the fact that these agitators 24 are disposed in staggered relation along the length of the racks, certain of the same, as shown in Fig. 3, being arranged in the center of the rack, while certain others are arranged in rear of the same, or at the side of the same, this arrangement tending to agitate thoroughly the straw carried on all parts of the rack. It is here also to be noted that, as shown in Fig. 3, these agitators are in certain instances carried on opposite sides of adjacent rack members and in certain other instances are carried on adjacent sides of adjacent rack members, this arrangement also acting to assist in the efficient agitation and distribution of the straw.

While I have in this application specifically described one embodiment of my invention, it is, of course, to be understood that the same is used for purposes of illustration and may be modified without departing from the spirit of the invention itself, as, to give one instance, by using any equivalent slotted or other construction instead of the slats shown, it being my intention to include all such modifications within the scope of the appended claims.

What I claim as new and desire to secure by Letters Patent is:

1. In a threshing machine, a straw rack comprising alternately arranged horizontal and inclined slatted portions, and arcuate toothed agitators attached to the ends of said inclined portions.

2. In a threshing machine, a straw rack comprising a plurality of inclined slatted portions, and arcuate toothed agitators carried on the ends thereof and bridging the space between each of the same.

3. In a threshing machine, a straw rack comprising alternately arranged horizontal and inclined slatted portions, and downwardly curved agitators attached to the ends of said inclined portions and protruding over said horizontal portions.

4. In a threshing machine, a straw rack comprising a plurality of spaced inclined slatted portions, and a plurality of arcuate toothed agitators attached to the ends thereof, one of said agitators being disposed beneath the plane of the active surface of its inclined portion.

5. In a threshing machine, a straw rack comprising a plurality of inclined slatted members disposed in planes at an angle to the horizontal, and toothed agitators carried upon the ends of certain of said inclined members disposed in planes substantially at right angles to the planes of the slats on said members.

6. In a threshing machine, a straw rack comprising a plurality of independently movable rack members disposed side by side and each having a plurality of slatted members disposed in different planes at an angle to the horizontal, and longitudinally projecting toothed agitators rigidly attached to said slatted members and disposed in planes intersecting substantially at right angles the planes thereof and imparting to the straw fed thereto an upward and downward movement.

7. In a threshing machine, a straw rack comprising a plurality of rack members movable in parallel planes, each of said rack members having a plurality of inclined slatted portions feeding the straw outward, means for imparting an orbital movement to said members, and supplemental arcuate toothed members carried thereby imparting an up and down movement to the straw carried thereon.

8. In a threshing machine, a plurality of rack members independently movable in parallel planes, each of said rack members having inclined slatted portions intermediate its ends, and longitudinally projecting agitator arms carried on certain of said inclined portions and arranged in staggered relation throughout the length of the rack.

9. In a threshing machine, a plurality of independently movable rack members movable in parallel planes, each including a plurality of inclined slatted members, and a plurality of forwardly projecting agitators carried on said slatted members disposed in planes at right angles to the planes of said slatted members and attached thereto on opposite sides of adjacent rack members.

10. In a threshing machine, a plurality of independently movable rack members movable in parallel planes, each including a plurality of inclined slatted members, and a plurality of forwardly projecting agitators carried on said slatted members disposed in planes at right angles to the planes of said slatted members and attached thereto on the same sides of adjacent rack members.

11. A grain threshing machine including, in combination, a frame structure, two multiple-throw crank shafts journaled in bearings carried by said frame structure, straw racks mounted upon the crank portions of said shafts, means for transmitting motion to one of said shafts from a source of power, said racks being operative as pitmen in a manner to transmit synchronous rotary motion to said other crank shaft, said straw racks including side rails spaced apart, transversely arranged slats spaced apart and secured to said side rails and spaced apart in horizontal series, upwardly and rearwardly inclined risers secured to said side rails at the rear ends of each of said horizontal series of slats, transverse slats spaced apart and secured to said risers, and upwardly and rearwardly curved agitator bars secured to the rear ends of said risers.

FRANK N. G. KRANICH.

Witnesses:
HARRY H. LEMPKE,
JOHN H. JONES.

Copies of this patent may be obtained for five cents each, by addressing the "Commissioner of Patents. Washington, D. C."